United States Patent
Keating et al.

(10) Patent No.: US 10,368,366 B2
(45) Date of Patent: Jul. 30, 2019

(54) METHOD AND APPARATUS FOR IMPLEMENTING UPLINK SCHEDULING IN AN UNLICENSED SPECTRUM

(71) Applicant: NOKIA SOLUTIONS AND NETWORKS OY, Espoo (FI)

(72) Inventors: Ryan Keating, Chicago, IL (US); Rapeepat Ratasuk, Hoffman Estates, IL (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 116 days.

(21) Appl. No.: 14/856,113

(22) Filed: Sep. 16, 2015

(65) Prior Publication Data
US 2017/0079060 A1 Mar. 16, 2017

(51) Int. Cl.
*H04W 4/00* (2018.01)
*H04L 5/14* (2006.01)
(Continued)

(52) U.S. Cl.
CPC ... *H04W 72/1278* (2013.01); *H04W 72/0406* (2013.01); *H04W 72/0453* (2013.01); *H04W 72/1215* (2013.01); *H04W 74/0808* (2013.01)

(58) Field of Classification Search
CPC ......... H04W 72/1278; H04W 72/1215; H04W 72/0406; H04W 74/0808
See application file for complete search history.

(56) References Cited

U.S. PATENT DOCUMENTS

2013/0208587 A1* 8/2013 Bala ............... H04W 16/14
 370/230
2013/0223298 A1* 8/2013 Ahn ............... H04B 7/2643
 370/280
(Continued)

FOREIGN PATENT DOCUMENTS

| GB | 2498988 A | 8/2013 | |
|---|---|---|---|
| WO | 2013086659 A1 | 6/2013 | |
| WO | WO 2013086659 A1 * | 6/2013 | ............ H04W 74/08 |

OTHER PUBLICATIONS

ZTE; R1-150156; Analysis on potential issues and solutions for LAA UL transmission; 2015; 3GPP TSG RAN WG1 Meeting #80, Athens, Greece, Feb. 9-13, 2015; 3GPP Draft; Feb. 8, 2015; XP050933370; Retrieved from the Internet: URL:http://www.3gpp.org/ftp/Meetings_3GPP_SYNC/RAN1/Docs/ [retrieved on Feb. 8, 2015]; sections 2.11, 2.1.2, 2.1.3, 2.1.4.
(Continued)

*Primary Examiner* — Thai D Hoang
(74) *Attorney, Agent, or Firm* — Squire Patton Boggs (US) LLP

(57) ABSTRACT

A method and apparatus may include determining that downlink communication is to be scheduled for transmission to user equipment. The method may also include scheduling the downlink communication. The method may also include scheduling uplink communication. The uplink communication is transmitted by user equipment to the network node. The uplink communication and the downlink communication are transmitted such that (1) uplink frequency resources are the same as downlink frequency resources, (2) uplink frequency resources are contained within downlink frequency resources, or (3) uplink frequency resources overlap with downlink frequency resources. The method may also include signaling user equipment to ignore a carrier sensing mechanism. User
(Continued)

equipment transmits the uplink communication at a time specified by the network node.

19 Claims, 13 Drawing Sheets

(51) Int. Cl.
*H04W 72/12* (2009.01)
*H04W 72/04* (2009.01)
*H04W 74/08* (2009.01)

(56) References Cited

U.S. PATENT DOCUMENTS

| | | | | |
|---|---|---|---|---|
| 2014/0376483 | A1* | 12/2014 | Hong | H04W 72/048 370/329 |
| 2015/0029904 | A1* | 1/2015 | Khojastepour | H04L 5/16 370/277 |
| 2015/0029905 | A1* | 1/2015 | Yi | H04L 1/0026 370/277 |
| 2015/0049712 | A1 | 2/2015 | Chen et al. | |
| 2015/0124740 | A1* | 5/2015 | Chen | H04W 16/14 370/329 |
| 2016/0286603 | A1* | 9/2016 | Vajapeyam | H04W 76/048 |
| 2016/0373235 | A1* | 12/2016 | Oh | H04L 1/18 |
| 2017/0048880 | A1* | 2/2017 | Anderson | H04W 72/1226 |

OTHER PUBLICATIONS

International Search Report and Written Opinion international application No. PCT/EP2016/069595 dated Nov. 4, 2016.

\* cited by examiner

METHOD AND APPARATUS FOR IMPLEMENTING UPLINK SCHEDULING IN AN UNLICENSED SPECTRUM

BACKGROUND

Field

Certain embodiments of the present invention relate to implementing uplink scheduling in an unlicensed spectrum.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include determining, by a network node, that downlink communication is to be scheduled for transmission to user equipment. The method may also include scheduling the downlink communication. The method may also include scheduling uplink communication. The uplink communication is transmitted by user equipment to the network node. The uplink communication and the downlink communication may be transmitted such that (1) uplink frequency resources are the same as downlink frequency resources, (2) uplink frequency resources are contained within downlink frequency resources, or (3) uplink frequency resources overlap with downlink frequency resources. The method may also include signaling user equipment to ignore a carrier sensing mechanism. User equipment transmits the uplink communication at a time specified by the network node.

In the method of the first embodiment, the method may also include performing the downlink communication and the uplink communication in parallel.

In the method of the first embodiment, the determining may include determining that the downlink communication is to be transmitted in an unlicensed spectrum.

In the method of the first embodiment, the determining may include determining by an evolved Node B.

In the method of the first embodiment, the signaling user equipment to ignore the carrier sensing mechanism comprises signaling user equipment to ignore listen-before-talk.

In the method of the first embodiment, the signaling may be configured via at least one of downlink control information, radio resource control, and system information blocks.

In the method of the first embodiment, the method may also include training self-interference cancellation filters during a first portion of the downlink communication.

In the method of the first embodiment, the method may also include signaling user equipment to begin the uplink communication after the training of the self-interference cancellation filters has completed.

In the method of the first embodiment, the signaling user equipment to begin the uplink communication after the training may include signaling user equipment to puncture out symbols in the uplink transmission.

According to a second embodiment, an apparatus may include at least one processor. The apparatus may also include at least one memory including computer program code. The at least one memory and the computer program code may be configured, with the at least one processor, to cause the apparatus at least to determine that downlink communication is to be scheduled for transmission to user equipment. The apparatus may also be caused to schedule the downlink communication. The apparatus may also be caused to schedule uplink communication. The uplink communication may be transmitted by user equipment to the apparatus, and the uplink communication and the downlink communication are transmitted such that (1) uplink frequency resources are the same as downlink frequency resources, (2) uplink frequency resources are contained within downlink frequency resources, or (3) uplink frequency resources overlap with downlink frequency resources. The apparatus may also be caused to signal user equipment to ignore a carrier sensing mechanism. User equipment transmits the uplink communication at a time specified by the network node.

In the apparatus of the second embodiment, the apparatus may be further caused to perform the downlink communication and the uplink communication in parallel.

In the apparatus of the second embodiment, the determining may include determining that the downlink communication is to be transmitted in an unlicensed spectrum.

In the apparatus of the second embodiment, the apparatus may include an evolved Node B.

In the apparatus of the second embodiment, the signaling user equipment to ignore the carrier sensing mechanism comprises signaling user equipment to ignore listen-before-talk.

In the apparatus of the second embodiment, the signaling may be configured via at least one of downlink control information, radio resource control, and system information blocks.

In the apparatus of the second embodiment, the apparatus may be further caused to train self-interference cancellation filters during a first portion of the downlink communication.

In the apparatus of the second embodiment, the apparatus may be further caused to signal user equipment to begin the uplink communication after the training of the self-interference cancellation filters has completed.

In the apparatus of the second embodiment, the signaling user equipment to begin the uplink communication after the training may include signaling user equipment to puncture out symbols in the uplink transmission.

According to a third embodiment, a computer program product may be embodied on a non-transitory computer readable medium. The computer program product may be configured to control a processor to perform a method according to the first embodiment.

BRIEF DESCRIPTION OF THE DRAWINGS

For proper understanding of the invention, reference should be made to the accompanying drawings, wherein.

DETAILED DESCRIPTION

Figure 1:
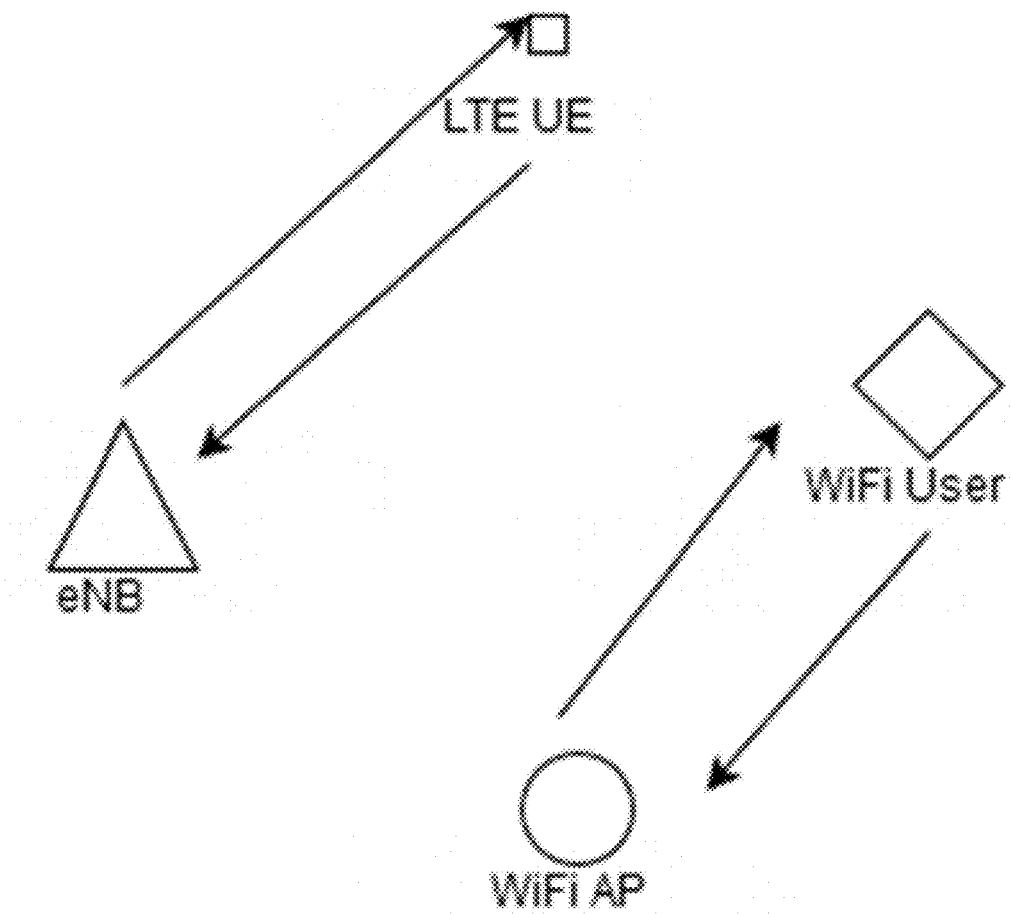
FIG. 1 illustrates an example scenario of unlicensed LTE.

Certain embodiments of the present invention relate to implementing uplink scheduling in an unlicensed spectrum via full duplex. Certain embodiments of the present invention relate to 4G/5G uplink transmission in an unlicensed spectrum. In LTE Release 13, Licensed-Assisted Access (LAA) is a work item which relates to the coexistence of LTE and WiFi in an unlicensed spectrum. When LTE is deployed in the unlicensed spectrum, LTE may use a Listen-Before-Talk (LBT) technique to determine if there is traffic in a particular channel before deciding to use that channel for transmission. Typically, both the evolved Node B (eNB) and the LTE UE perform LBT before they transmit on the downlink (DL) and the uplink (UL), respectively. In 5G (such as, in accordance with 3GPP Release 15 and beyond), a similar process may also be expected to be used in order to allow 5G Radio-Access Technology to use unlicensed spectrum.

Certain embodiments may also be directed to in-band wireless full duplex (FD) communication, which has been proposed as a method to achieve greater spectral efficiency in future cellular networks (such as, for example, 5G cellular networks).

Performing communications using in-band full duplex generally refers to transmitting and receiving on the same frequency, at the same time. With cellular systems, performing this communication may refer to communicating on uplink (UL) and downlink (DL) using the same frequency resources, or communicating on UL and DL where the uplink frequency resource overlaps with the downlink frequency resource, or communicating on UL and DL where the uplink frequency resource is contained within the downlink frequency resource. Typically, full duplex communication has been considered impossible due to a high level of self interference. However, recent research efforts have begun to overcome the previous limitations, and full duplex communication has been shown to be possible in real systems.

In-band full duplex communication may rely upon cancelling the signal that is being transmitted, utilizing the fact that the transmitted signal is known by the transmitter. For example, the transmitter may know the ideal baseband samples that are being sent. However, the signal may undergo different impairments along the signal chain before the signal leaks back into the receiver chain. This leakage occurs due to the same resource blocks being used and creates the strong self interference term. In order to fully cancel this self interference, which is generally necessary for full duplex to be achieved, these different impairments may need to be estimated accurately. Both analog and digital cancellation techniques may need to be employed in order to achieve the desired cancellation.

These methods for achieving the desired cancellation may require a training period for estimating the impairments. However, while the impairments are being estimated during the training period, useful information may still be sent during this training period. Sending useful information may include sending preambles and/or sending control information, for example. Accurately estimating the impairments that the transmitted signal has undergone may be important in order to achieve the best self-interference results.

One technical difficulty addressed by certain embodiments of the present invention is that LAA users may have a limited number of slots in which to transmit signals. The limited number of slots may affect the achievable throughput.

FIG. 1 illustrates an example of the LAA situation. An eNB and an LTE UE may seek to communicate on both the UL and DL, while interfering as little as possible with a WiFi Access Point (AP) that is communicating with the WiFi AP's own user. Typically, if both the LTE UE and the eNB have data to send, then the eNB first decides, through LBT, that the eNB may transmit on the DL. Next, the UE will wait for an additional slot to be free, again through LBT, before deciding to transmit on the UL.

Certain embodiments of the present invention may support full duplex communication in the implementation of LAA evolution (such as, for example, for Release 14 and on) and also in the implementation of 5G deployment in unlicensed spectrum. Certain embodiments of the present invention may allow the eNB to schedule an UL UE at the same time that the eNB is transmitting on the DL to a different user. In this case, the eNB will indicate to the UE to skip channel sensing because the eNB itself is occupying the channel.

One reason for using full duplex in an unlicensed spectrum is for enabling the use of a Carrier Sense Multiple Access (CSMA) scheme in the unlicensed spectrum. The CSMA scheme may require a device to first sense a channel and to only transmit when the noise and interference level is below a threshold. With certain embodiments, the eNB would transmit in the unlicensed band, subsequent to performing channel sensing using the Listen Before Talk (LBT) mechanism. This ensures that the eNB is the only major source of the interference and, therefore, the eNB would be able to reliably cancel out its self-interference after scheduling the UE to transmit within the same transmission window on the same or overlapping resources.

Certain embodiments of the present invention may include the following steps. When an eNB determines that it will schedule DL data packet(s) to one or more UEs in an unlicensed spectrum, the eNB will, in parallel, schedule UL data packet(s) for one or more UE(s) within the downlink transmission window.

The eNB will signal to the UL UE(s) that the UL UE(s) should ignore carrier sensing mechanisms. For example, the eNB may signal the UL UE(s) to ignore carrier sensing mechanisms such as listen-before-talk (LBT), and that the UL UE(s) should begin transmitting in the uplink at a time specified by the eNB.

This signalling by the eNB may be dynamically configured or configured via higher-layer signalling. The signalling by the eNB may be configured via downlink control information (DCI). The signalling may also be configured via, for example, Radio Resource Control (RRC) configuration. Alternatively, the signalling by the eNB may be cell-specific instead of UE-specific. The signalling may be broadcasted in one of the system information blocks.

Figure 4:
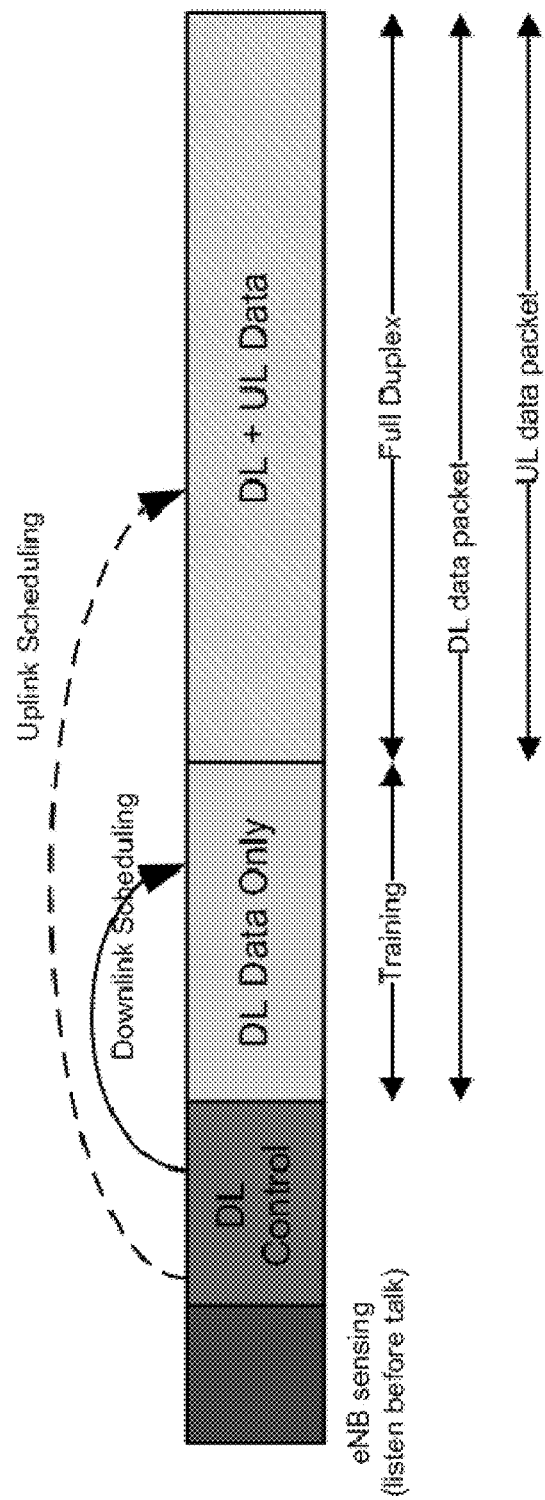
FIG. 4 illustrates 5G transmission in an unlicensed spectrum with full duplex, in accordance with certain embodiments.

In one embodiment, the UL UE may shorten the UL subframe so that the UL subframe finishes transmitting at the same time that the DL subframe finishes transmitting. FIG. 4 illustrates a 5G subframe. This shortening of the UL subframe may be achieved by puncturing out some symbols at the beginning of the uplink subframe.

With certain embodiments, the eNB may train its self-interference cancellation filters during a first portion of a DL frame.

In one embodiment, the eNB may be responsible for signalling the UL UE to begin transmissions once the training of the eNB's filters for self-interference cancellation has completed. For example, the eNB can signal the number of symbols to be punctured out (i.e., discontinuous transmission (DTX)) by the UE from the uplink subframe. FIG. 4 illustrates this embodiment.

In another embodiment, a constant training period may be pre-determined, and the UE may be responsible for puncturing out the appropriate number of symbols so as to not interfere with the eNB training With certain embodiments, the eNB should determine an amount of time that has elapsed since the last training of the eNB's filters for self-interference cancellation. If the determined elapsed time is less than the training period (which the eNB should also determine), the eNB can direct the UL UE to begin transmissions immediately (i.e., the UL UE is directed to ignore puncturing of symbols for that subframe). The training period may be dynamic as well. The time that is required for training may be adapted by the eNB.

With certain embodiments, only the eNB will perform the self-interference cancellation, and there is no change to the UE behaviour. As a result, when the eNB schedules UL data at the same time as DL transmission, there would be additional interference to the UE receiving DL data. However, certain results of certain embodiments (as shown, for example, by FIG. 8 through FIG. 10) show only small degradation to the DL throughput. As such, the eNB can mitigate this additional interference in full-duplex subframes by performing some or all of the following:

Modulation and Coding Scheme (MCS) adjustment (i.e., selecting of a lower MCS) to account for the additional interference;
  User selection to minimize the interference—for example, based on location, pathloss, and/or UE transmission power level;
  Use appropriate traffic types—for example, scheduling low-priority or best-effort traffic on the downlink in full-duplex subframes.

Figure 2:
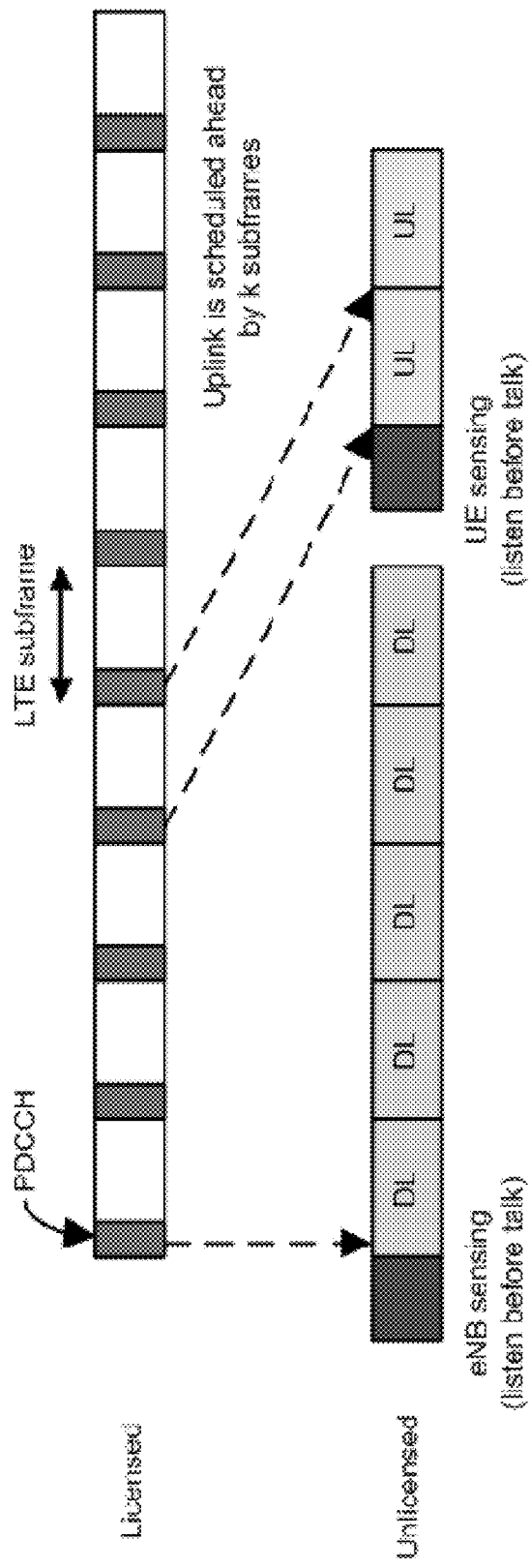
FIG. 2 illustrates Licensed-Assisted Access (LAA) with downlink and uplink transmission, in accordance with certain embodiments.
Figure 3:
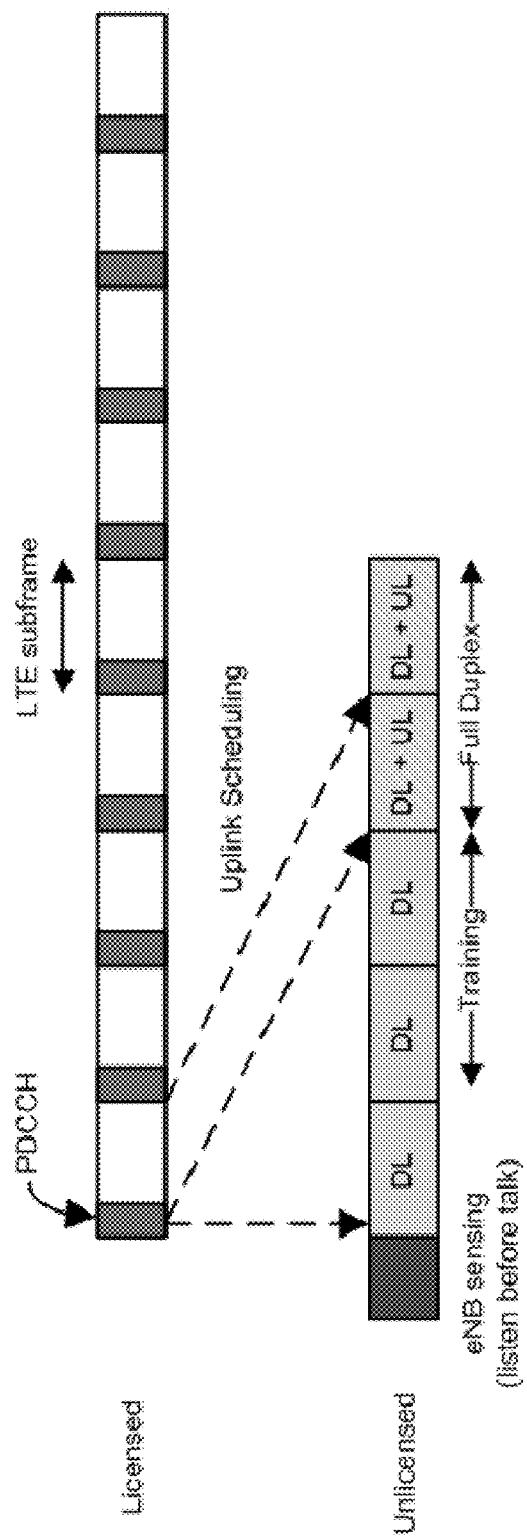
FIG. 3 illustrates LAA with full duplex transmission, in accordance with certain embodiments.

FIG. 1 illustrates an example concept for LAA. FIG. 2 illustrates LTE transmission in an unlicensed spectrum where both eNB and UE are required to perform LBT prior to transmission. FIG. 3 illustrates an embodiment where full duplex is used to transmit DL and UL simultaneously in the last two subframes. In this case, because the eNB is already occupying the channel, there is generally no need for the UE to perform LBT. The eNB may train its self-interference cancellation filters using the DL subframes prior to UL transmission.

FIG. 4 illustrates a 5G subframe structure where a portion of the subframe is used for full duplex transmission. In this case, a training period may be needed in the beginning to obtain filter coefficients for cancelling out the self-interference from the eNB. As a result, the uplink subframe may be shortened appropriately, based on the amount of training needed by the eNB.

Certain embodiments of the present invention provide improvements in performing transmissions on unlicensed spectrum. Certain embodiments of the present invention allow the eNB to schedule an UL UE during every DL slot. Certain embodiments may provide a dramatic improvement in the UL throughput of the system by taking advantage of full duplex capabilities at the eNB only. Certain embodiments do not affect the UEs other than to allow for the eNB to tell them to ignore LBT, meaning that no extensive equipment changes would be necessary from the perspective of the UE. This method can also be used to support UL transmission, without the need for LBT at the UE. For example, UEs may be only scheduled for transmission within the DL transmission window. This can reduce UE complexity and possibly lower cost, and LBT mechanism/hardware would not be needed.

One advantage provided by certain embodiments of the present invention is that any of the UL data that can be sent during the DL frames is a complete gain over previous approaches. This grants maximum data transfer in the time when the LTE-U system is active, which is ideal in the unlicensed band.

Figure 5:
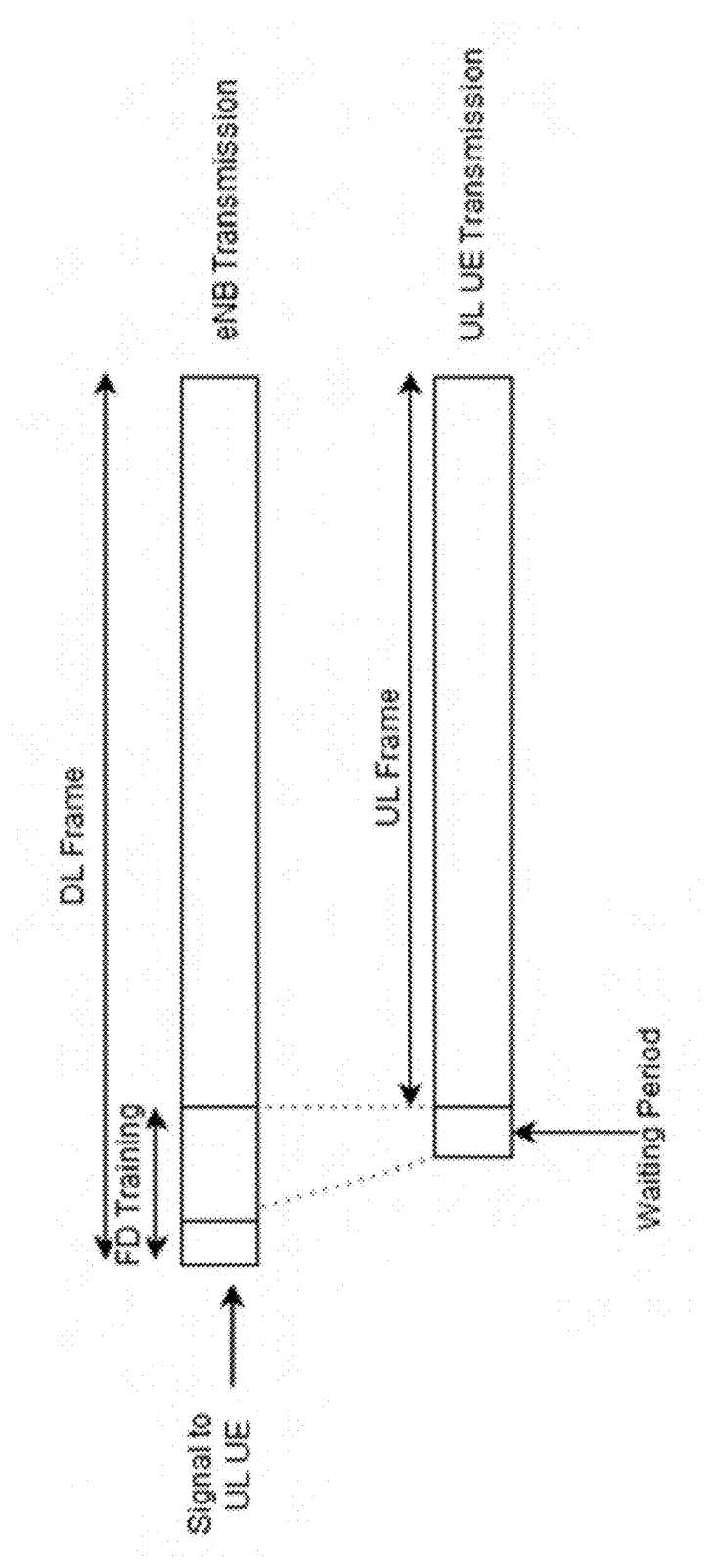
FIG. 5 illustrates a frame structure of certain embodiments.

Implementation of certain embodiments may be straightforward, as described above. FIG. 5 illustrates the frame structure of certain embodiments. The signalling to the UL UE may be used as a part of the Full Duplex (FD) training As mentioned above, the training data can still be data that is useful to either the DL or UL UE. During the waiting period, the UL UE may stay silent and then begin transmitting data to the eNB after the waiting period is over.

Figure 6:
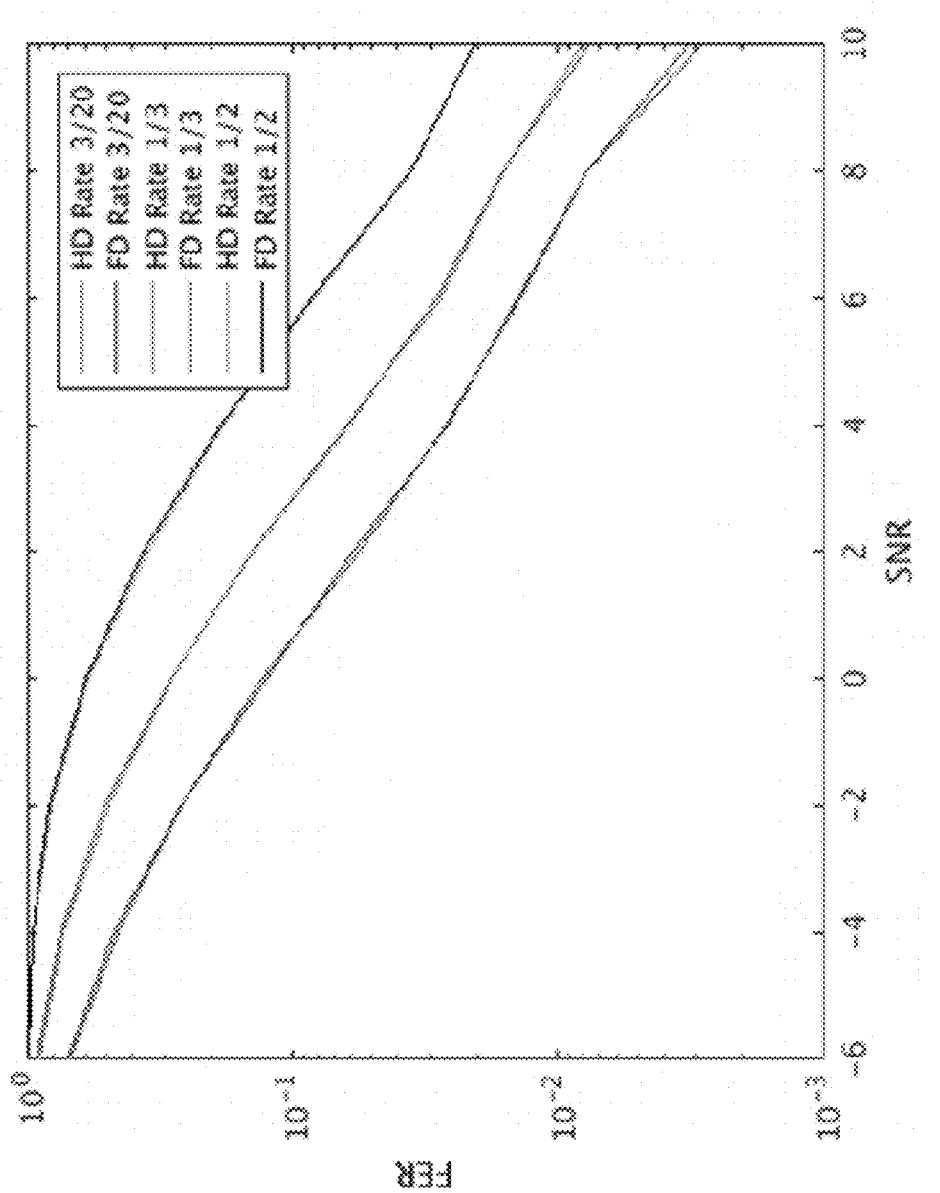
FIG. 6 illustrates results of utilizing Quadrature Phase Shift Keying (QPSK) full duplex, in accordance with certain embodiments.
Figure 7:
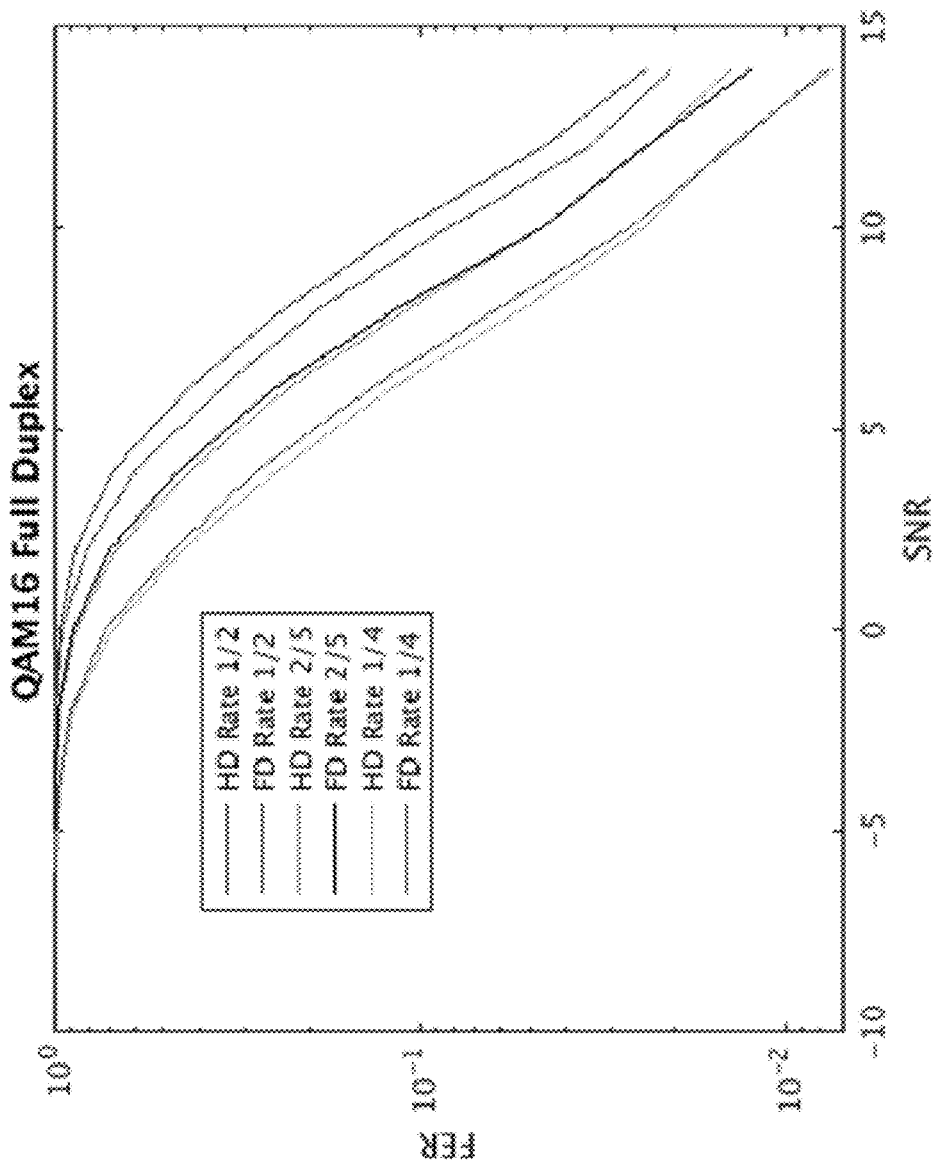
FIG. 7 illustrates results of utilizing Quadrature Amplitude Modulation (QAM16) full duplex, in accordance with certain embodiments.

With regard to full duplex analysis, full duplex has been investigated on both the link and system levels in order to determine if this technology is viable. For the link level, test training was performed once every 100 ms. FIG. 6 and FIG. 7 illustrate the frame error rates (FER) of QPSK and QAM16, respectively. FIG. 6 and FIG. 7 illustrate multiple coding rates where the full duplex operation exhibits only slightly worse performance in terms of FER, and would achieve close to the theoretical 2× gain in throughput on the link level.

Figure 8:
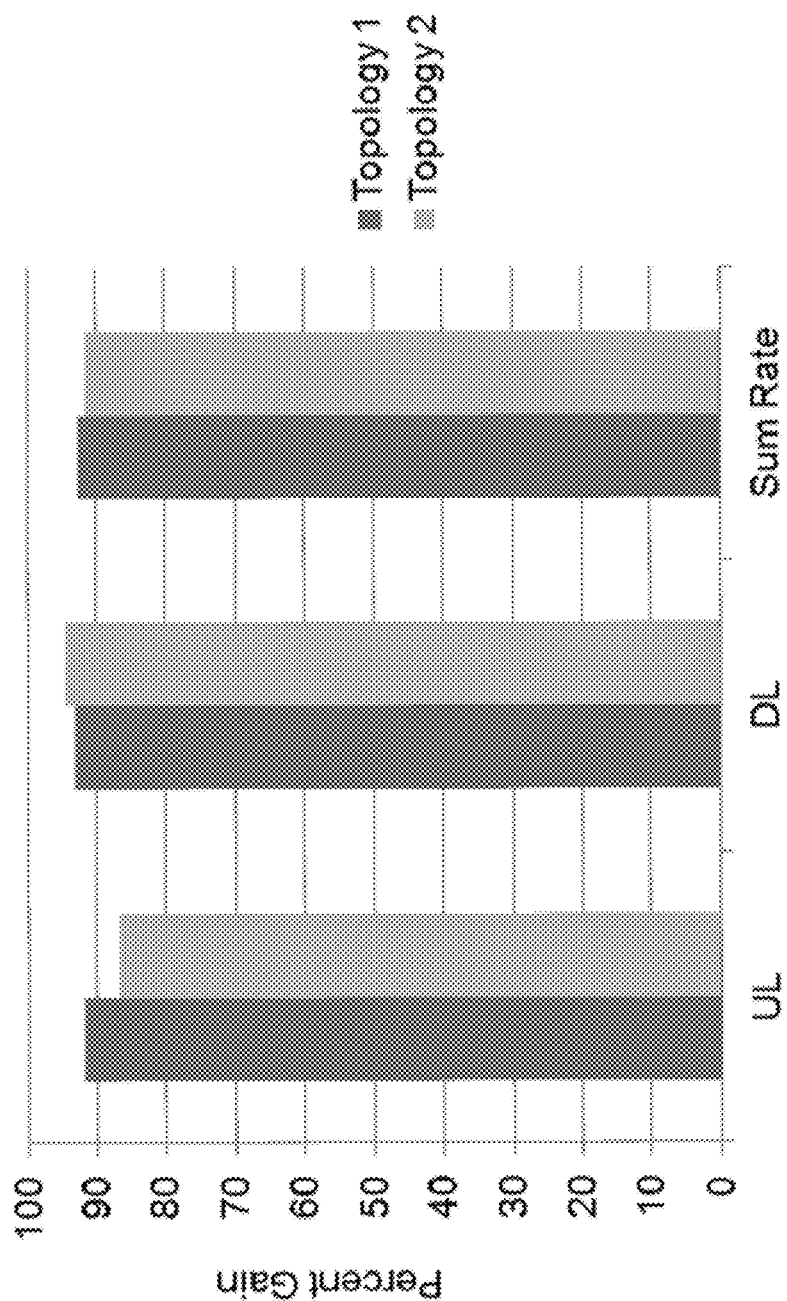
FIG. 8 illustrates a percent gain of full duplex over half duplex, in accordance with certain embodiments.

System level analysis has also been performed using the link level results as a basis for a system level model. Initial testing focused on one isolated cell with an omnidirectional antenna. FIG. 8 illustrates the results for two different topologies, one with ten UEs dropped into the cell, and one with only two UEs dropped into the cell. These results show that there is, in fact, almost a 2× gain in throughput when comparing half duplex and full duplex modes.

Figure 9:
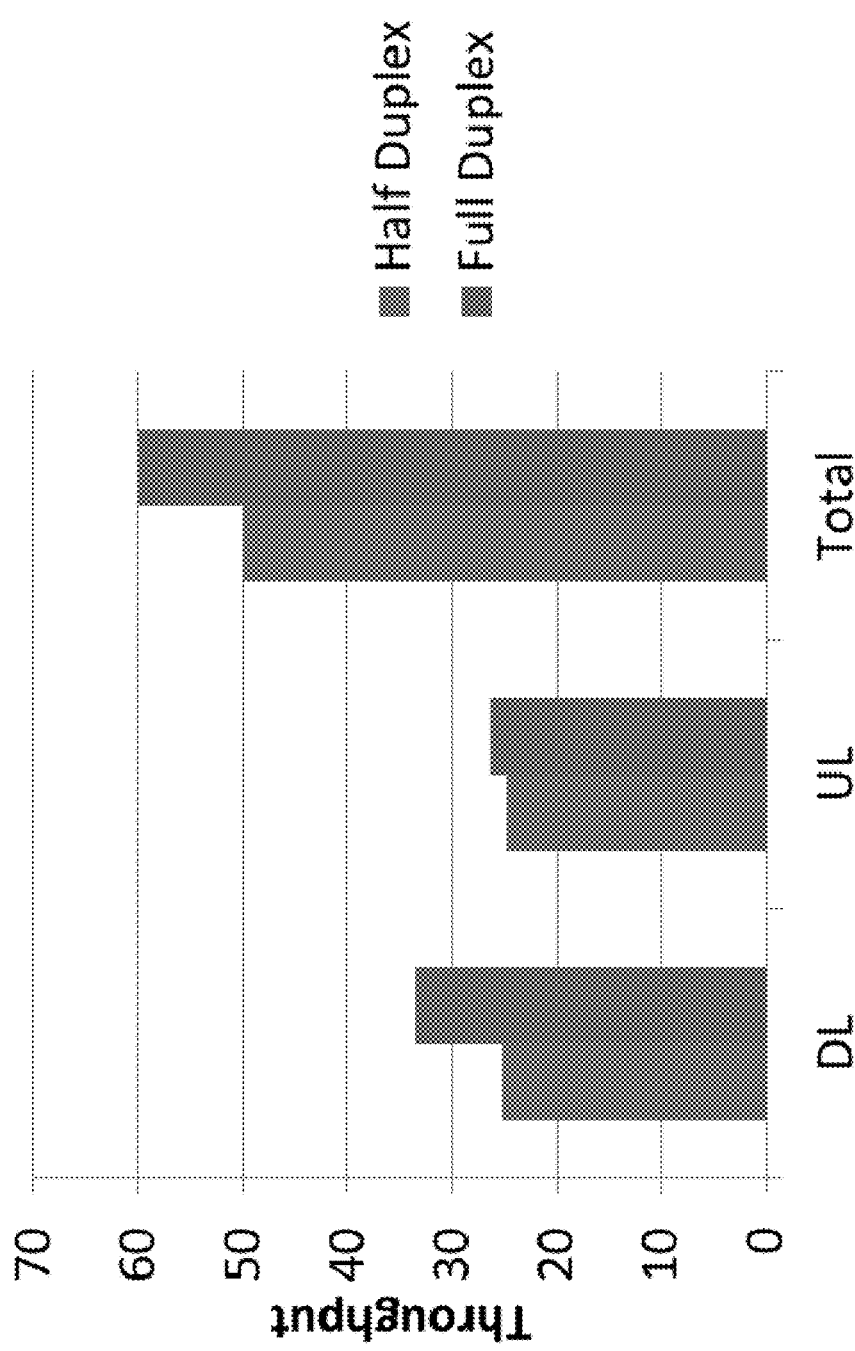
FIG. 9 illustrates throughput results for indoor hotspot, in accordance with certain embodiments.
Figure 10:
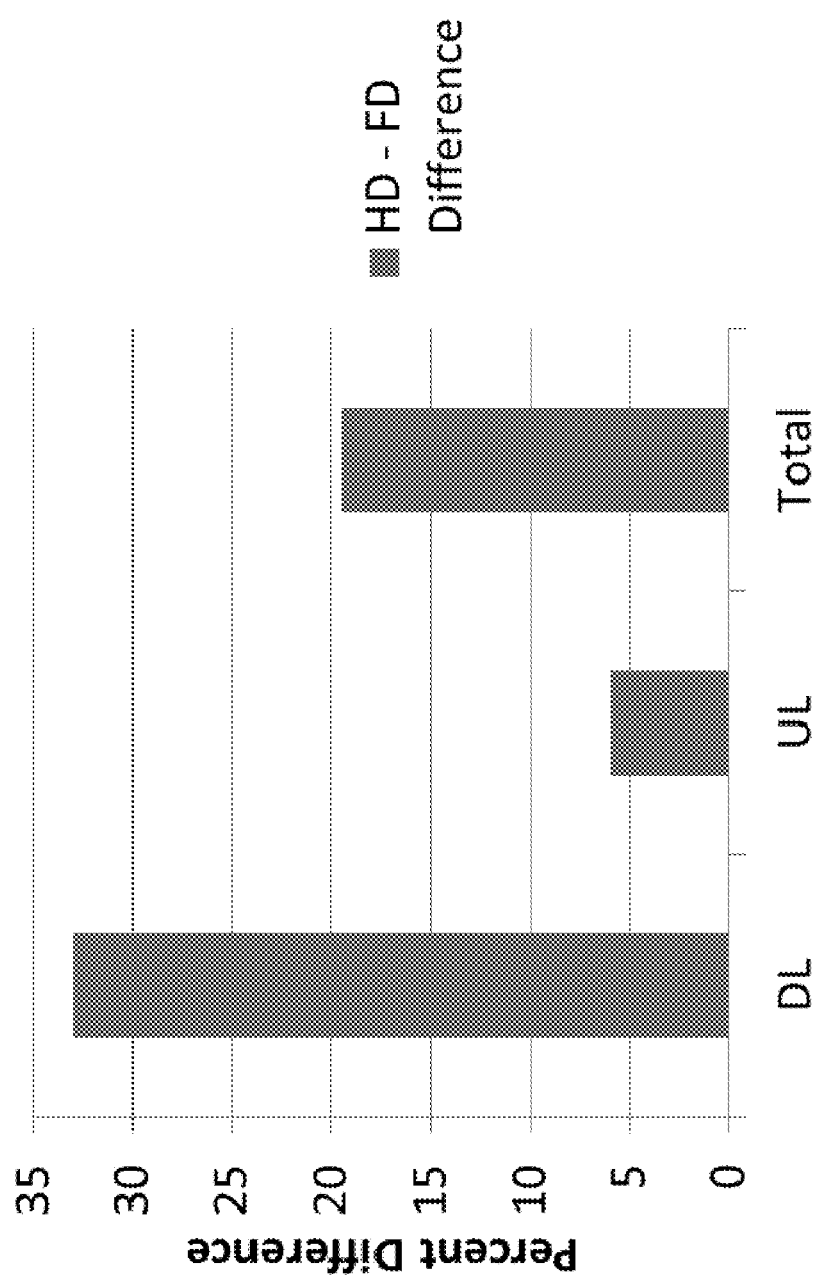
FIG. 10 illustrates a percent gain from full duplex, in accordance with certain embodiments.

Next, full duplex was investigated in the context of the Indoor Hotspot Scenario. With a full buffer traffic model for all UEs and eNBs, this context will generally generate a worst case interference pattern. Using this traffic model, certain embodiments of the present invention were still able to show a large improvement in the capacity of the Indoor Hotspot. FIG. 9 illustrates the throughput results in comparison to the half duplex benchmark. FIG. 10 then illustrates the percent gain in the full duplex case over half duplex.

The eNB may be assumed to have the capabilities to perform full duplex communication. This means that only limited changes to the network equipment are necessary to take advantage of these gains. The capacity gains, in practice, could be even larger than the ones presented here due to the traffic model used.

Figure 11:
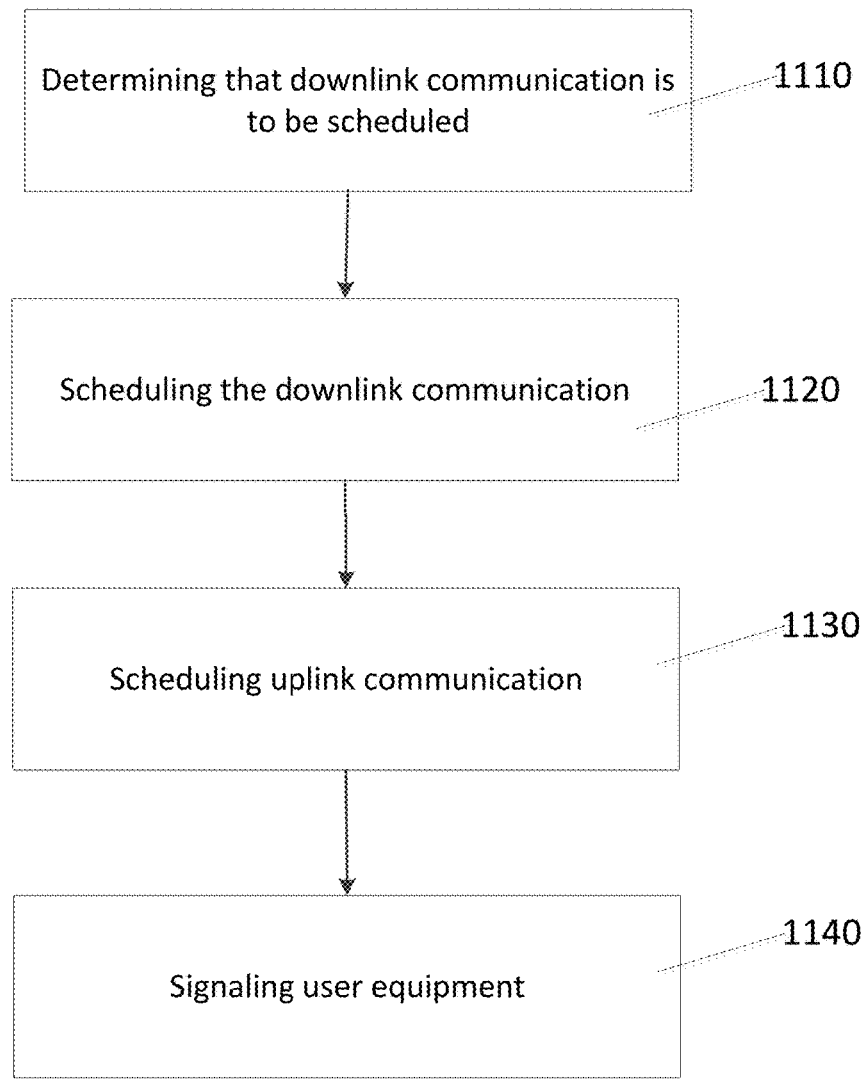
FIG. 11 illustrates a flowchart of a method in accordance with certain embodiments of the invention.

FIG. 11 illustrates a flowchart of a method in accordance with certain embodiments of the invention. The method illustrated in FIG. 11 includes, at 1110, determining, by a network node, that downlink communication is to be scheduled for transmission to user equipment. The method may also include, at 1120, scheduling the downlink communication. The method may also include, at 1130, scheduling uplink communication. The scheduling of the downlink communication may occur before, during, and/or after the scheduling of the uplink communication. For example, in the event that uplink communication is scheduled before scheduling downlink communication, suppose UL is scheduled in subframe n (i.e., where the network node sends an UL grant to user equipment in subframe n, for the user equipment to transmit UL data in subframe n+4, for example). DL data may then be scheduled in subframe n+4 to overlap with the already scheduled UL transmission. The uplink communication is transmitted by user equipment to the network node. The uplink communication and the downlink communication are transmitted such that (1) uplink frequency resources are the same as downlink frequency resources, (2) uplink frequency resources are contained within downlink frequency resources, or (3) uplink frequency resources overlap with downlink frequency resources. The method may also include, at 1140, signaling user equipment to ignore a carrier sensing mechanism. User equipment transmits the uplink communication at a time specified by the network node.

Figure 12:
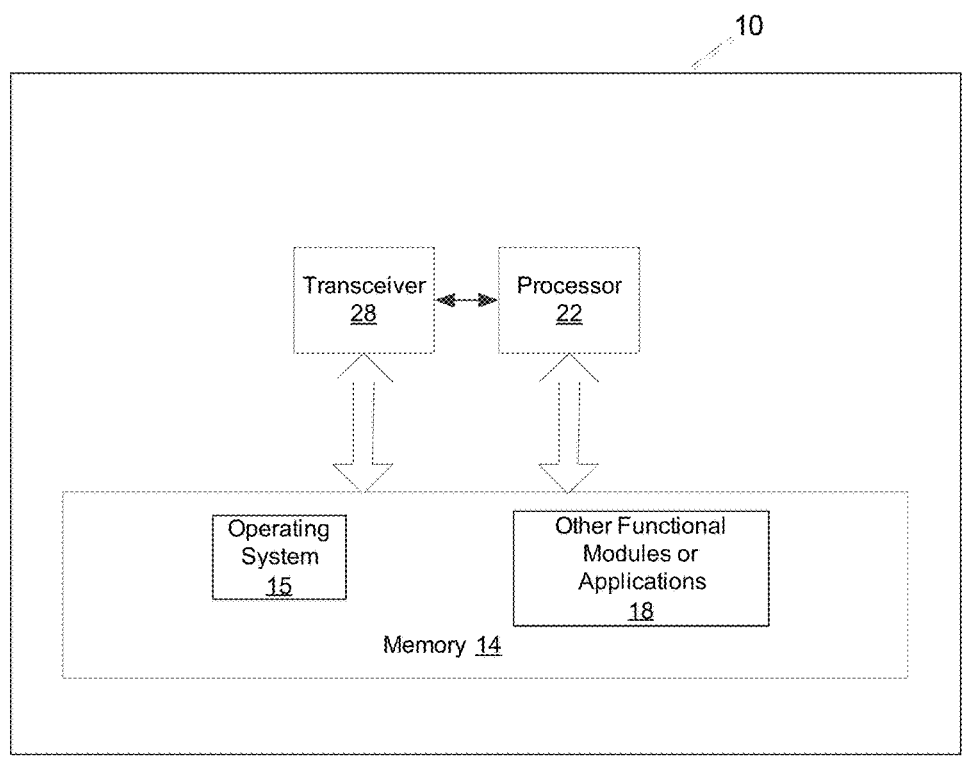
FIG. 12 illustrates an apparatus in accordance with certain embodiments of the invention.

FIG. 12 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 12, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 may include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 13:
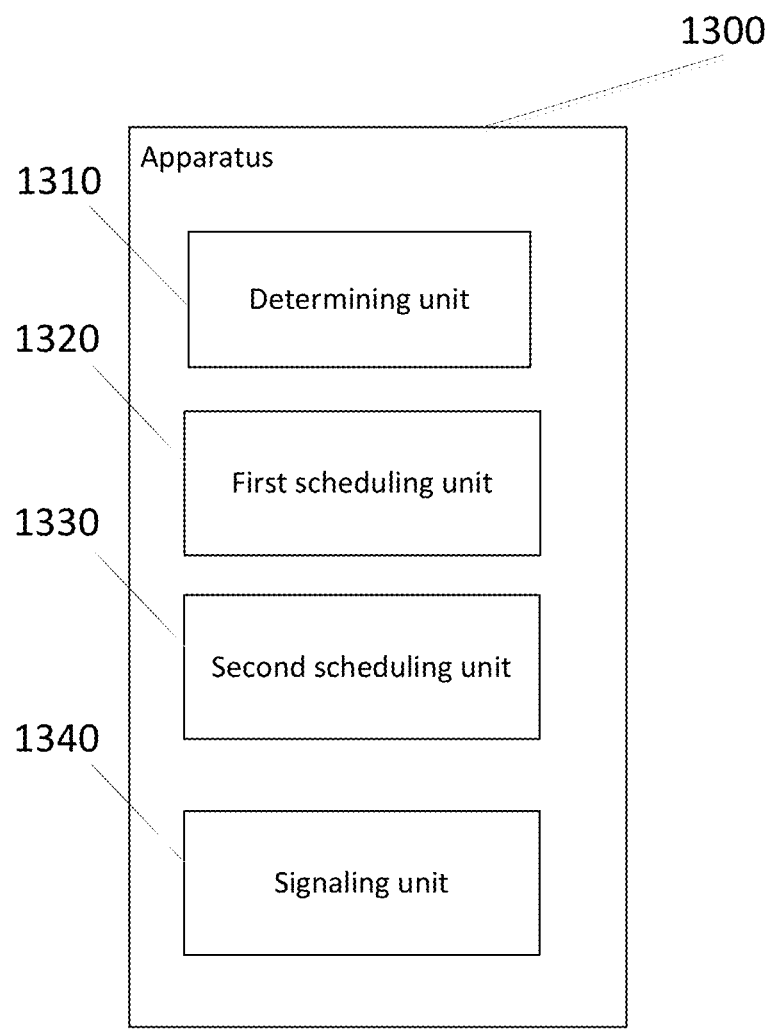
FIG. 13 illustrates an apparatus in accordance with certain embodiments of the invention.

FIG. 13 illustrates an apparatus in accordance with certain embodiments of the invention. Apparatus 1300 can be a network node such as an evolved Node B and/or a base station, for example. Apparatus 1300 can include a determining unit 1310 that determines that downlink communication is to be scheduled for transmission to user equipment. Apparatus 1300 may also include a first scheduling unit 1320 that schedules the downlink communication. Apparatus 1300 may also include a second scheduling unit 1330 that schedules uplink communication. The uplink communication is transmitted by user equipment to the network node. The uplink communication and the downlink communication are transmitted such that (1) uplink frequency resources are the same as downlink frequency resources, (2) uplink frequency resources are contained within downlink frequency resources, or (3) uplink frequency resources overlap with downlink frequency resources. Apparatus 1300 may also include a signalling unit 1340 that signals user equipment to ignore a carrier sensing mechanism. User equipment transmits the uplink communication at a time specified by the network node.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    determining, by a network node, that downlink communication is to be scheduled for transmission to user equipment;
    scheduling the downlink communication;
    scheduling uplink communication, wherein the uplink communication is transmitted by the user equipment to the network node, and wherein the scheduled uplink communication and the scheduled downlink communication are transmitted at a same time such that (1) uplink frequency resources given in downlink control information are the same as downlink frequency resources given in the downlink control information, or (2) uplink frequency resources given in the downlink control information are contained within downlink frequency resources given in the downlink control information; and based on the network node determining that the downlink communication is to be scheduled, signaling the user equipment, in downlink control information, to ignore a carrier sensing mechanism, wherein the user equipment transmits the uplink communication at a time specified by the network node.

2. The method according to claim 1, further comprising performing the downlink communication and the uplink communication in parallel.

3. The method according to claim 1, wherein the determining comprises determining that the downlink communication is to be transmitted in an unlicensed spectrum.

4. The method according to claim 1, wherein the determining comprises determining by an evolved Node B.

5. The method according to claim 1, wherein the signaling user equipment to ignore the carrier sensing mechanism comprises signaling user equipment to ignore listen-before-talk.

6. The method according to claim 1, wherein the signaling is configured via at least one of downlink control information, radio resource control, and system information blocks.

7. The method according to claim 1, further comprising training self-interference cancellation filters during a first portion of the downlink communication.

8. The method according to claim 7, further comprising signaling user equipment to begin the uplink communication after the training of the self-interference cancellation filters has completed.

9. The method according to claim 8, wherein the signaling user equipment to begin the uplink communication after the training comprises signaling user equipment to puncture out symbols in the uplink transmission.

10. An apparatus, comprising:
at least one processor; and
at least one memory including computer program code,
the at least one memory and the computer program code configured, with the at least one processor, to cause the apparatus at least to
determine that downlink communication is to be scheduled for transmission to user equipment;
schedule the downlink communication;
schedule uplink communication, wherein the uplink communication is transmitted by the user equipment to the apparatus, and wherein the scheduled uplink communication and the scheduled downlink communication are transmitted at a same time such that (1) uplink frequency resources given in downlink control information are the same as downlink frequency resources given in the downlink control information, or (2) uplink frequency resources given in the downlink control information are contained within downlink frequency resources given in the downlink control information; and
based on the apparatus determining that the downlink communication is to be scheduled, signal the user equipment, in downlink control information, to ignore a carrier sensing mechanism, wherein the user equipment transmits the uplink communication at a time specified by the apparatus.

11. The apparatus according to claim 10, wherein the apparatus is further caused to perform the downlink communication and the uplink communication in parallel.

12. The apparatus according to claim 10, wherein the determining comprises determining that the downlink communication is to be transmitted in an unlicensed spectrum.

13. The apparatus according to claim 10, wherein the apparatus comprises an evolved Node B.

14. The apparatus according to claim 10, wherein the signaling user equipment to ignore the carrier sensing mechanism comprises signaling user equipment to ignore listen-before-talk.

15. The apparatus according to claim 10, wherein the signaling is configured via at least one of downlink control information, radio resource control, and system information blocks.

16. The apparatus according to claim 10, wherein the apparatus is further caused to train self-interference cancellation filters during a first portion of the downlink communication.

17. The apparatus according to claim 16, wherein the apparatus is further caused to signal user equipment to begin the uplink communication after the training of the self-interference cancellation filters has completed.

18. The apparatus according to claim 17, wherein the signaling user equipment to begin the uplink communication after the training comprises signaling user equipment to puncture out symbols in the uplink transmission.

19. A computer program product, embodied on a non-transitory computer readable medium, the computer program product configured to control a processor to perform a method, comprising:
determining, by a network node, that downlink communication is to be scheduled for transmission to user equipment;
scheduling the downlink communication;
scheduling uplink communication, wherein the uplink communication is transmitted by the user equipment to the network node, and wherein the scheduled uplink communication and the scheduled downlink communication are transmitted at a same time such that (1) uplink frequency resources given in downlink control information are the same as downlink frequency resources given in the downlink control information, or (2) uplink frequency resources given in the downlink control information are contained within downlink frequency resources given in the downlink control information; and
based on the network node determining that the downlink communication is to be scheduled, signaling the user equipment, in downlink control information, to ignore a carrier sensing mechanism, wherein the user equipment transmits the uplink communication at a time specified by the network node.

* * * * *